Sept. 15, 1925.
F. E. RICKETTS
RELAY SYSTEM
Filed April 4, 1919
1,553,396
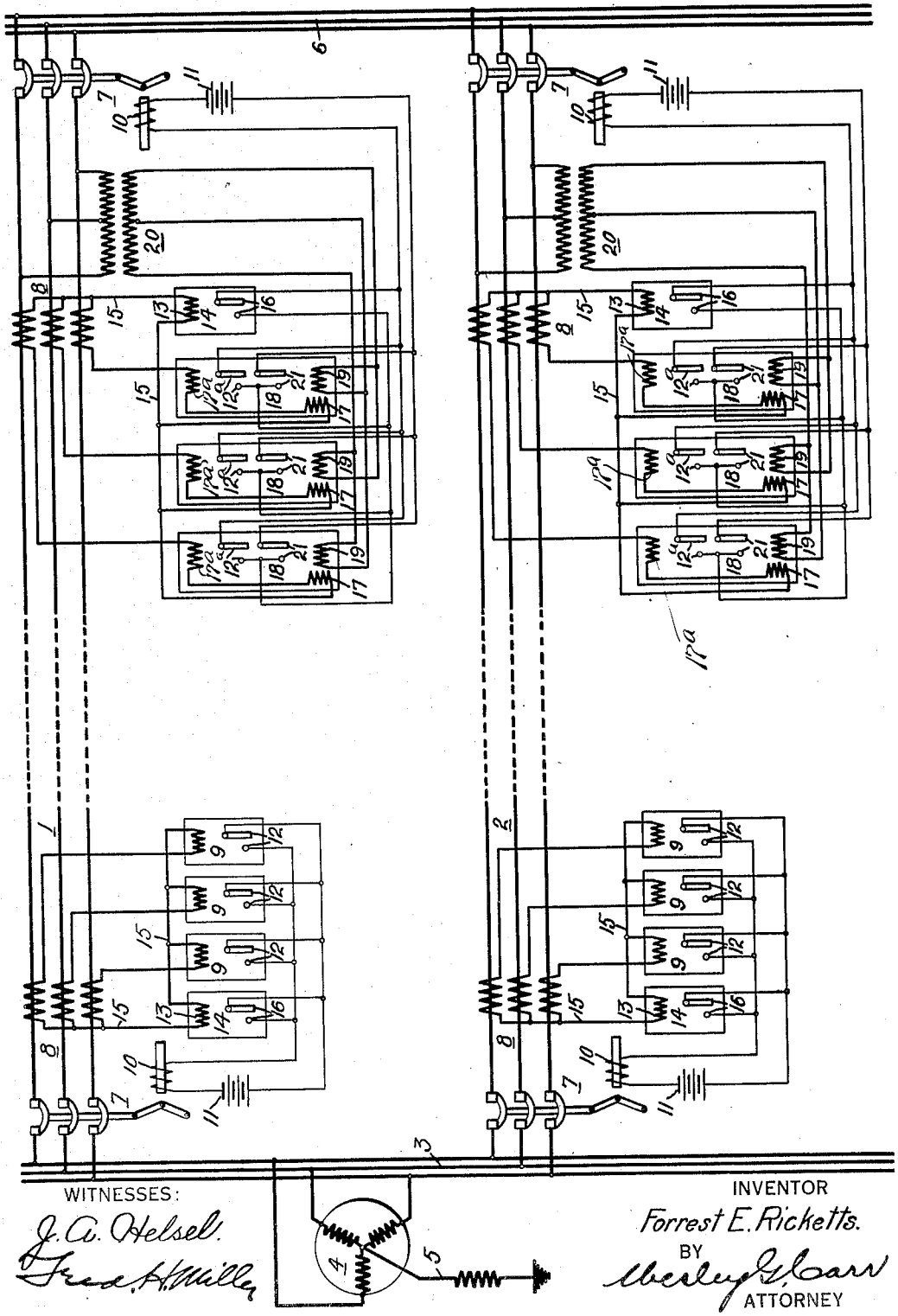
WITNESSES:
J. C. Helsel.
Fred H. Miller
INVENTOR
Forrest E. Ricketts.
BY
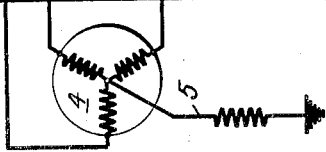
ATTORNEY Patented Sept. 15, 1925.

1,553,396

UNITED STATES PATENT OFFICE.

FORREST E. RICKETTS, OF BALTIMORE, MARYLAND, ASSIGNOR TO WESTINGHOUSE ELECTRIC & MANUFACTURING COMPANY, A CORPORATION OF PENNSYLVANIA.

RELAY SYSTEM.

Application filed April 4, 1919. Serial No. 287,603.

*To all whom it may concern:*

Be it known that I, FORREST E. RICKETTS, a citizen of the United States, and a resident of Baltimore, in the State of Maryland, have invented a new and useful Improvement in Relay Systems, of which the following is a specification.

My invention relates to relay systems and particularly to means for protecting parallel-connected feeder circuits.

One object of my invention is to provide a system of the above indicated character that shall have means for selectively disconnecting a feeder circuit when a short circuit, a reversal of power or a ground occurs thereon, and in which a circuit interrupter, that may be adjusted to operate at relatively high load value, will operate upon the occurrence of a ground of relatively low current value.

Another object of my invention is to provide a single means whereby a circuit interrupter for a multiphase electrical circuit will be operated in response to a grounded circuit in any one or a number of phases.

In practicing my invention, I provide, in a system comprising two parallel-related multi-phase circuits having circuit interrupters severally adapted to open all the conductors in one of the circuits, relays severally connected to different conductors. Sets of the relays, corresponding to the number of feeder conductors, operate parallel-related contact members for tripping one of the said circuit interrupters in response to an overload in any conductor. Each set of relays is energized from star-connected current transformers in the multi-phase circuit.

A sensitive relay, constructed to operate at relatively low current values, is connected in series with the neutral conductor of said star-connected transformers and is adapted to close the tripping circuit, at the receiving end of the system, by closed-circuiting the above mentioned parallel-related contact members. Since, under normal balanced-load conditions, there will be no current in the neutral circuit mentioned, the overload interrupter may be set to operate at any predetermined load. This is an advantage when the neutral conductor of a multi-phase system is grounded through a high resistance, since the current in a ground circuit may be of very nearly the same value as that of the normal load. Under these conditions, the interrupter normally must be set at such low value of overload as to cause unnecessary interruptions upon the occurrence of relatively slight variations in the load.

At the distributing end of the system, the sensitive relays close-circuit only the contacts of the overload relays that are in series with the current elements of reverse-power relays, thereby permitting the latter to close the tripping circuit at lower current values.

In the accompanying drawings, the single figure is a diagrammatic view of a relay system embodying my invention.

Two sets of multi-phase parallel-connected transmission lines 1 and 2 receive current from busses 3 that are connected to a generator 4 having a relatively high-resistance grounded neutral conductor 5, and are connected to distributing lines 6. Circuit interrupters 7, in each set of transmission lines, are adapted to simultaneously open circuit all of the conductors of the respective sets of lines 1 and 2 with which they are associated.

At the receiving end of the system, star-connected multi-phase transformers 8 are similarly connected to overload relays 9 and transmit current thereto in proportion to the current in each conductor of the lines 1 and 2.

Trip coils 10 are connected in series with batteries 11 to receive current therefrom when any one or a number of sets of contact members 12, that are connected in parallel relation to the circuits of the coils 10 and the batteries 11, are actuated to closing position by the passage of current of predetermined value through the respective relays 9 thereof. Coils 13 of relays 14 are connected in series-relation to the neutral conductors 15 of the transformers 8 and are, therefore, energized only when unbalanced load occurs in the lines 1 and 2 to actuate, to closing position, co-operating contact members 16 that are connected, in parallel relation, to the contact members 12. By constructing the relays 14 to be responsive to currents of low values, the interrupters 7 may be actuated upon the occurrence of a ground circuit of insufficient value to effectively energize the overload relays 9, thereby permitting the latter to be adjusted to higher safe-load values and prevent interruptions in the system upon the occurrence of fluctuating loads.

At the distributing ends of the lines 1 and 2, the coils of the current elements 17ª, that control the contact members 12ª, are connected in series-relation to current coils 17 of the directional elements of reverse-power relays 18. Voltage coils 19 of the relays 18 are connected to voltage transformers 20 in the lines 1 and 2 and actuate normally-separated co-operating contact members 21 to closing position. Each pair of members 21 is connected, in series relation, to a pair of the members 12ª, and the respective sets of members 21 and 12ª, thus connected, are connected in parallel relation to each other and to close the circuit of the trip coil 10.

The contact members 16 of the sensitive relay 14 at the distributing end of the system are connected to short circuit all of the contact members 12ª at said end and thereby place all of the members 21 in such relation to the coil 10 as to complete the circuit thereof when a ground occurs.

Upon the occurrence of a short circuit in either of the sets of lines 1 and 2, one or more of the overload relays 9 at the receiving end of the faulty circuit will operate to trip its respective interrupter 7. The interrupter at the distributing end of the system will remain closed by reason of the fact that, since the members 12ª and 21 are in series, when there is no grounded circuit, a reversal of power is required simultaneously with an excess of current to actuate the interrupter at the distributing end.

When one or more of the feeder conductors becomes grounded, for example, should the ground occur in the set of lines 1, the load, being unbalanced, will cause current to flow in the neutral conductors of both of the transformers 8 in the lines 1. This will actuate the sensitive relays 14 to directly trip the interrupter at the receiving end and to short circuit the overload contact members 12ª at the distributing end, thus permitting the reverse-power relays 18 to close or not to close the circuit of the trip coils 10 at the distributing end of the lines 1 accordingly, whether the ground is in the lines 1 or 2. If the ground occurs in the lines 1, the power in the system will be directed from the lines 2 to the lines 6 and in the reverse direction in the lines 1, thus closing the contact members 21 associated with the lines 1 and tripping the corresponding interrupter 7 at the distributing end thereof.

This relation is reciprocal between the lines 1 and 2 and permits the interruption of the one or the other and one to remain in service.

The above described arrangement of relays provides a parallel-related multi-phase transmission system that is adequately protected against overloads and reversals of power. The overload interrupters may be set at safe predetermined values to insure stable operation of the circuit with fluctuating loads and be caused to operate upon the occurrence of a ground of low current value.

While I have shown and described a particular form of my invention, changes may be effected therein without departing from the spirit and scope thereof, as set forth in the appended claims.

I claim as my invention:

1. In an electrical distributing system, the combination with a feeder circuit and reverse power relays embodying an overload element for the protection thereof, of a single relay responsive to ground currents of any value for eliminating the overload element of the reverse power relays to render the relays more sensitive.

2. In an electrical distributing system, the combination with a feeder circuit and reverse power relays embodying an overload element for the protection thereof, of means responsive to ground currents for eliminating the overload element of the reverse power relays to permit the directional element thereof to control the disconnection of the feeder circuit from the system.

3. In an electrical distributing system, the combination with a feeder circuit and reverse power relays embodying an overload element for the protection thereof, of means responsive to ground currents for eliminating the overload element of the reverse power relays to permit the directional element thereof to discriminate between a fault on the corresponding feeder circuit and a fault on a parallel feeder circuit.

4. In an electric circuit, the combination with a circuit-interrupter, of means responsive to a reversal of power of predetermined value in the circuit for actuating said interrupter and means responsive to a ground current of any value for cooperating with said first-mentioned means to actuate said interrupter irrespective of the value of the reversed power.

5. In an electric circuit, the combination with a circuit-interrupter, of means for actuating the circuit-interrupter at a predetermined overload effected by a reversal of power in the circuit and means cooperating therewith for actuating said interrupter upon the occurrence of a ground current of any value.

6. The combination with parallel-related multiphase circuits having a grounded neutral, circuit interrupters in said circuits, current transformers in said circuits, voltage transformers connected to said circuits, reverse-power relays embodying current elements connected to both the said current and voltage transformers and serving to actuate said interrupters, of sensitive relays disposed in the neutrals of said current transformers to short-circuit the contacts of said current elements to permit said reverse-power relays to operate the circuit interrupters.

7. The combination with parallel-related multiphase circuits having a high-resistance grounded neutral, circuit-interrupters at both the receiving and distributing ends of said circuits, current transformers at each of said ends, overload relays connected to said transformers for operating said circuit-interrupters at the receiving ends and reverse-power relays embodying current elements for operating the interrupters at the distributing ends of said circuits, of sensitive relays disposed in the neutrals of said transformers, certain of the said sensitive relays being connected to directly trip the interrupters at the receiving ends of said circuits by short-circuiting the contacts of the overload relays at the said receiving ends, and others of the said sensitive relays being connected to short circuit the contacts of the current elements at the distributing ends of said circuits to permit corresponding reverse-power relays to operate the interrupters at the latter ends.

8. In an electric system, the combination with protective relays provided with a current-controlled switch and a power directional switch for controlling a predetermined portion of the system, of means responsive to a ground current for short-circuiting the current-controlled switch to permit the directional switch alone to control the associated portion of the system.

9. A protective system for an electric circuit comprising a switch that is closed when the circuit current attains or exceeds a predetermined value, a second switch that is actuated when the power traverses the circuit in a predetermined direction and means for eliminating the control of the current-controlled switch when a ground occurs.

10. A protective system for an electric circuit comprising a switch that is closed when the circuit current attains or exceeds a predetermined value, a second switch that is actuated when the power traverses the circuit in a predetermined direction and means responsive to a ground current traversing the circuit for controlling the effectiveness of the current-controlled switch.

11. A protective system for an electric circuit comprising means controlled in accordance with the current traversing the electric circuit, co-operating means controlled in accordance with the direction of the power traversing the circuit and means responsive to a ground current in the circuit for controlling the effectiveness of the current-controlled means.

12. A protective system for an electric circuit comprising means controlled in accordance with the current traversing the electric circuit, co-operating means controlled in accordance with the direction of the power traversing the circuit and means for controlling the effectiveness of the current-controlled means in its co-operation with the power-directional means.

In testimony whereof, I have hereunto subscribed my name this 18th day of March 1919.

FORREST E. RICKETTS.